United States Patent
Sun et al.

(10) Patent No.: US 7,121,080 B2
(45) Date of Patent: Oct. 17, 2006

(54) COMPUTER READABLE STORAGE MEDIUM WITH INSTRUCTIONS FOR MONITORING CATALYTIC DEVICE

(75) Inventors: Jing Sun, Bloomfield, MI (US); Yong-Wha Kim, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 421 days.

(21) Appl. No.: 10/658,018

(22) Filed: Sep. 8, 2003

(65) Prior Publication Data
US 2005/0050879 A1    Mar. 10, 2005

(51) Int. Cl.
*F01N 3/00* (2006.01)
*F01N 3/10* (2006.01)

(52) U.S. Cl. .............. 60/277; 60/285; 60/295; 60/300

(58) Field of Classification Search .......... 60/272, 60/277, 282, 285, 295, 299
See application file for complete search history.

(56) References Cited

U.S. PATENT DOCUMENTS

| | | | | |
|---|---|---|---|---|
| 5,491,975 A | * | 2/1996 | Yamashita et al. | 60/276 |
| 5,564,404 A | * | 10/1996 | Takahashi et al. | 123/676 |
| 5,673,555 A | * | 10/1997 | Achleitner | 60/274 |
| 5,743,084 A | | 4/1998 | Hepburn | |
| 6,148,612 A | * | 11/2000 | Yamashita et al. | 60/277 |
| 6,357,224 B1 | | 3/2002 | Kawamoto et al. | |
| 6,497,092 B1 | * | 12/2002 | Theis | 60/274 |
| 6,698,188 B1 | * | 3/2004 | Irisawa et al. | 60/285 |
| 6,804,951 B1 | * | 10/2004 | Nader et al. | 60/277 |

FOREIGN PATENT DOCUMENTS

| | | |
|---|---|---|
| GB | 2 318 417 | 4/1998 |
| GB | 2 318 418 | 4/1998 |
| GB | 2 333 368 | 7/1999 |
| JP | 08-232644 | 9/1996 |
| JP | 11-062562 | 3/1999 |

* cited by examiner

*Primary Examiner*—Thomas Denion
*Assistant Examiner*—Loren Edwards
(74) *Attorney, Agent, or Firm*—Allan J. Lippa; Alleman Hall McCoy Russell & Tuttle LLP (57) ABSTRACT

A computer control system is described that monitors the functionality of an emission control device that is capable of storing NOx and oxygen during lean conditions, and releasing/reducing the stored oxygen and NOx during rich operating conditions. The computer uses a readable storage medium having stored data representing instructions executable by a computer. The instructions utilize a ratio between a lean operating time and a rich operating time to determine whether the catalyst has degraded.

9 Claims, 5 Drawing Sheets

COMPUTER READABLE STORAGE MEDIUM WITH INSTRUCTIONS FOR MONITORING CATALYTIC DEVICE

BACKGROUND OF THE INVENTION

NOx emission control devices, for example catalysts containing a precious metal and elements such as barium, cesium, and lanthanum, can be used to reduce NOx emissions for lean burn engines, such as direct injection spark ignition engine. These devices store NOx produced during the engine lean operation. Since these devices have a finite NOx storage capacity, it has to be regenerated every once in a while in order to sustain long periods of lean operation. This regeneration can be accomplished with rich engine operation during which the device releases and converts the stored NOx.

These emission control devices can be exposed to environments with high temperature from the engine exhaust gas and also from the exotherm introduced by chemical reactions, such as reduction of stored oxidants. The high temperature exposure over time can reduce oxidant (e.g., O2 and NOx) storage capacity. In addition to temperature effects, sulfur in the engine exhaust gas can form sulfates on the storage sites, thereby reducing the storage capacity. Both the exhaust emissions and the fuel consumption increase as the storage capacity decreases.

One approach to monitoring the effectiveness of an exhaust emission control device used during lean operation to reduce NOx emissions monitors the rich purging time of rich cycles. Such a device is described in JP 08-232644.

The inventors herein have recognized a disadvantage with approaches that simply consider the rich purging time, or only consider the lean NOx storage time of an emission control device. Specifically, simply monitoring the rich purging time results in large deviation of measurement results depending how much NOx was stored in the device, thereby requiring complex algorithms and significant model calibration efforts. Similarly, only monitoring the lean storage time does not take into account variations in NOx releasing/reduction reactions that can change as the catalyst ages.

SUMMARY OF AN ASPECT OF THE INVENTION

The above disadvantages are overcome by a computer readable storage medium having stored data representing instructions executable by a computer to monitor a catalytic device coupled in an exhaust of an internal combustion engine of a vehicle.

The storage medium comprises:

instructions for determining a lean operation time during which the engine is operated lean;

instructions for determining a rich operation time during which the engine is operated rich;

instructions for determining a ratio between said lean time and said rich time; and instructions for determining degradation of the catalyst based on said ratio.

By using a ratio of the lean and the rich durations, information from both the oxidant storage ability (NOx storage capacity) and the NOx releasing/reduction capability is utilized to determine the functionality of the catalyst. In this way, improved diagnostics can be achieved with reduced calibration complexity and computational load.

BRIEF DESCRIPTION OF THE DRAWINGS

The advantages described herein will be more fully understood by reading an example of an embodiment in which the invention is used to advantage, referred to herein as the Description of An Embodiment, with reference to the drawings, wherein.

DESCRIPTION OF AN EMBODIMENT

Figure 1:
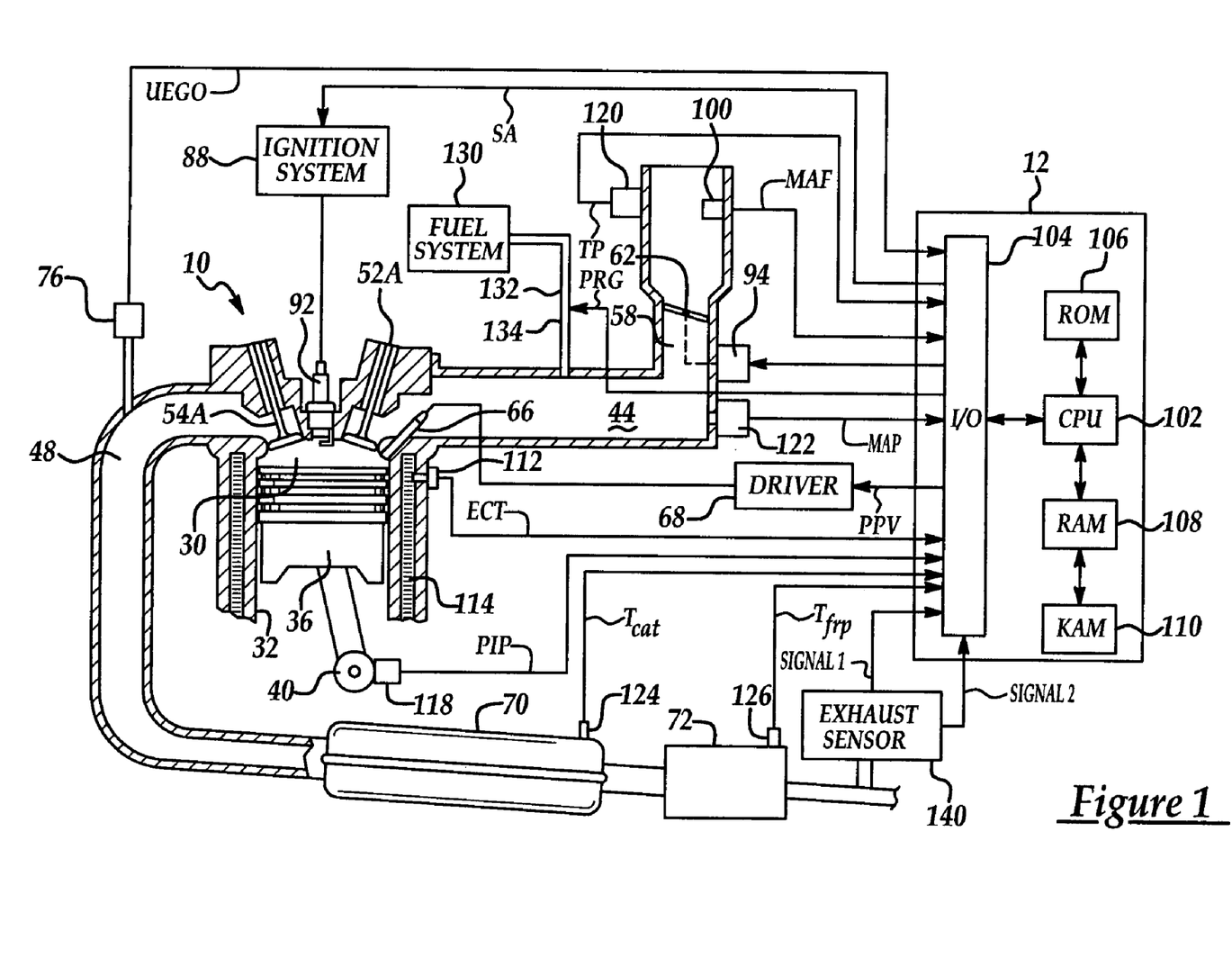
FIG. 1 is a schematic diagram of an engine wherein the invention is used to advantage.

Direct injection spark ignited internal combustion engine 10, comprising a plurality of combustion chambers, is controlled by electronic engine controller 12 as shown in FIG. 1. Combustion chamber 30 of engine 10 includes combustion chamber walls 32 with piston 36 positioned therein and connected to crankshaft 40. In this particular example, piston 30 includes a recess or bowl (not shown) to help in forming stratified charges of air and fuel. Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel injector 66 by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC) which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas oxygen sensor 76 is shown coupled to exhaust manifold 48 upstream of catalytic converter 70. In this particular example, sensor 76 provides signal UEGO to controller 12 which converts signal UEGO into a relative air-fuel ratio $\lambda$. Signal UEGO is used to advantage during feedback air-fuel ratio control in a manner to maintain average air-fuel ratio at a desired air-fuel ratio as described later herein. In an alternative embodiment, sensor 76 can provide signal EGO (not show) which indicates whether exhaust air-fuel ratio is either lean of stoichiometry or rich of stoichiometry.

Conventional distributorless ignition system 88 provides ignition spark to combustion chamber 30 via spark plug 92 in response to spark advance signal SA from controller 12.

Controller 12 causes combustion chamber 30 to operate in either a homogeneous air-fuel ratio mode or a stratified air-fuel ratio mode by controlling injection timing. In the stratified mode, controller 12 activates fuel injector 66 during the engine compression stroke so that fuel is sprayed directly into the bowl of piston 36. Stratified air-fuel ratio layers are thereby formed. The strata closest to the spark plug contains a stoichiometric mixture or a mixture slightly rich of stoichiometry, and subsequent strata contain progressively leaner mixtures. During the homogeneous mode, controller 12 activates fuel injector 66 during the intake stroke so that a substantially homogeneous air-fuel ratio mixture is formed when ignition power is supplied to spark plug 92 by ignition system 88. Controller 12 controls the amount of fuel delivered by fuel injector 66 so that the homogeneous air-fuel ratio mixture in chamber 30 can be selected to be substantially at (or near) stoichiometry, a value rich of stoichiometry, or a value lean of stoichiometry. Operation substantially at (or near) stoichiometry refers to conventional closed loop oscillatory control about stoichiometry. The stratified air-fuel ratio mixture will always be at a value lean of stoichiometry, the exact air-fuel ratio being a function of the amount of fuel delivered to combustion chamber 30. An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Catalytic converter 72 can be a Nitrogen oxide (NOx) absorbent or trap, and can be a single brick, or multiple bricks in a single canister, or multiple bricks in multiple canisters. Catalyst 72 is shown positioned downstream of catalytic converter 70. Catalyst 72 absorbs NOx when engine 10 is operating lean of stoichiometry. The absorbed NOx is subsequently reacted with HC and catalyzed during a NOx purge cycle when controller 12 causes engine 10 to operate in either a rich mode or a near stoichiometric mode.

Controller 12 is shown in FIG. 1 as a conventional microcomputer including: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

In this particular example, temperature Tcat of catalytic converter 70 and temperature Ttrp of catalyst 72 are inferred from engine operation as disclosed in U.S. Pat. No. 5,414,994, the specification of which is incorporated herein by reference. In an alternate embodiment, temperature Tcat is provided by temperature sensor 124 and temperature Ttrp is provided by temperature sensor 126.

Fuel system 130 is coupled to intake manifold 44 via tube 132. Fuel vapors (not shown) generated in fuel system 130 pass through tube 132 and are controlled via purge valve 134. Purge valve 134 receives control signal PRG from controller 12.

Exhaust sensor 140 is a sensor that produces two output signals. First output signal (SIGNAL1) and second output signal (SIGNAL2) are both received by controller 12. Exhaust sensor 140 can be a sensor known to those skilled in the art that is capable of indicating both exhaust air-fuel ratio and nitrogen oxide concentration.

In one embodiment, SIGNAL1 indicates exhaust air-fuel ratio and SIGNAL2 indicates nitrogen oxide concentration. In this embodiment, sensor 140 has a first chamber (not shown) in which exhaust gas first enters where a measurement of oxygen partial pressure is generated from a first pumping current. Also, in the first chamber, oxygen partial pressure of the exhaust gas is controlled to a predetermined level. Exhaust air-fuel ratio can then be indicated based on this first pumping current. Next, the exhaust gas enters a second chamber (not shown) where NOx is decomposed and measured by a second pumping current using the predetermined level. Nitrogen oxide concentration can then be indicated based on this second pumping current.

In an alternative embodiment, a port fuel injection engine can be used as engine 10, where fuel is injected through port injectors into intake manifold 44. The port injected engine can operate homogeneously substantially at stoichiometry, rich of stoichiometry, or lean of stoichiometry.

Those skilled in the art will recognize, in view of this disclosure, that the methods of the present invention can be used to advantage with either port fuel injected or directly injected engines.

Figure 2:
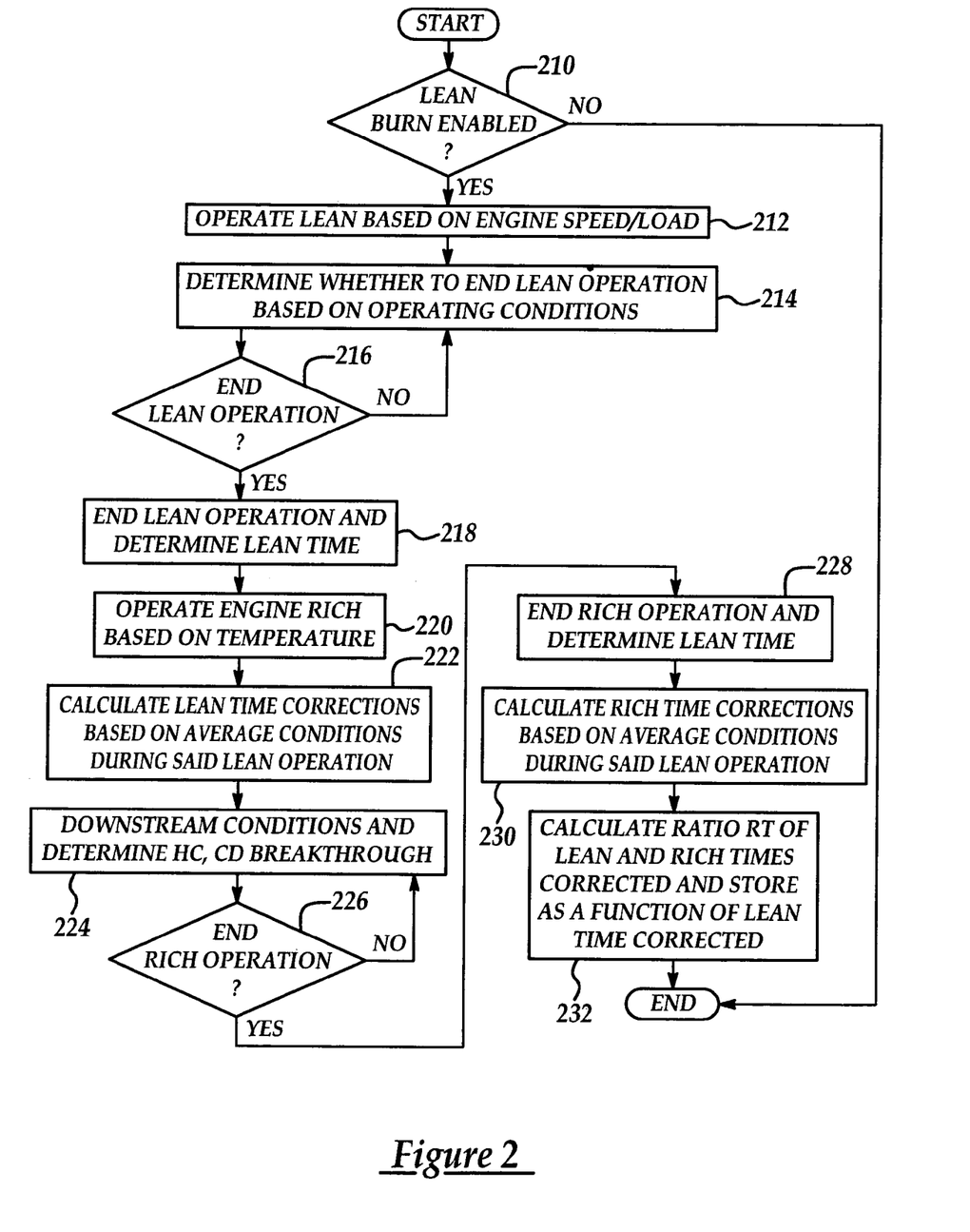
FIGS. 2–3 are high level flow charts of routines for controlling the engine and monitoring the emission control system.

Referring now to FIG. 2, a routine is described for controlling and determining lean and rich operating times. First, in step 210, the routine determines whether lean burn engine operation is enabled. This determination can be based on various engine operating factors, such as for example: time since engine start, exhaust gas temperature, engine coolant temperature, and various other factors. When the answer to step 210 is "yes", the routine continues to step 212. In step 212, the routine operates the engine at a lean air-fuel ratio (generally leaner than approximately 18:1). The lean air-fuel ratio set point is generally determined based on engine speed versus engine load maps. The lean combustion air-fuel ratio value is controlled to set point via feedback from exhaust gas oxygen sensors using a proportional-integral feedback controller. Further, in an alternate embodiment, the desired lean air-fuel ratio can be determined based on a requested engine torque versus engine speed.

Next, in step 214, the routine determines whether to end lean operation based on an operating condition. There are various methods available for making this determination. In one example, the routine estimates the amount of NOX stored in the emission control device using an estimate of the amount of NOX generated in the engine and cumulatively adding this amount to integrate the generated NOX amount and thereby determine the amount of NOX stored. When this amount of NOX that is estimated to be stored in the emission control device reaches a preset value, the routine indicates that lean operation should be ended.

In an alternate embodiment, the routine utilizes a downstream NOX sensor that detects the NOX concentration exiting the emission control device. The routine determines an amount of exiting NOX per distance traveled by the vehicle, and compares this value to a set point level of emissions per distance. When the measured amount of NOX per distance traveled by the vehicle reaches the threshold, the routine determines that lean operation should be ended. Further, there are various other methods that can be used to determine when to end the lean operation.

In step 216, the routine checks to see whether lean operation should be ended as determined by step 214. When the answer to step 216 is "no", the routine returns to continue monitoring whether to end lean operation in step 214. When the answer to step 216 is "yes", the routine continues to step 218.

In step 218, the routine ends the lean operation and determines the lean operating time of the just ended lean operation. Next, in step 220, the routine commences rich engine operation to purge stored oxidants in the emission control device. The degree of richness at which the engine operates during this rich operating period is determined based on various operating conditions, such as for example: exhaust gas temperature, emission control device temperature, and engine conditions such as engine speed.

Continuing with FIG. 2, in step 222, the routine calculates a lean time correction based on the average engine operating conditions during the lean operation. These corrections are described in more detail below with regard to FIGS. 4B, 4C, and 4D and equations 1–4. Note that only a single correction parameter can be used, or any combination of correction parameters can be used, or all of the lean correction parameters can be used. Then, in step 224, the routine determines conditions downstream of the emission control device to monitor for reductant (HC and CO) breakthrough. Reductant breakthrough downstream of the emission control device during rich operation indicates that a significant portion of the stored oxidants (oxygen and NOX) have been released and reduced across the catalytic surface of the emission control device. There are various methods for monitoring whether reductant breakthrough has occurred, such as, for example: using an exhaust gas oxygen sensor downstream of the emission control device and monitoring whether the sensor indicates a transition from a lean to a stoichiometric or a rich condition, or whether the sensor indicates a transition from a stoichiometric to a rich operating condition.

Then, in step 226, the routine determines whether rich operation should be ended based on the detected breakthrough in step 224. When the answer to step 226 is "yes", the routine continues to step 228. When the answer to step 226 is "no", the routine returns to step 224 to continue monitoring the conditions downstream of the emission control device.

Continuing with FIG. 2, in step 228 the routine ends the rich operation and determines the rich operating time of the just ended rich operation. Then, in step 230, the routine calculates rich time corrections based on the average conditions during the rich operation and utilizing the graphs described in FIGS. 4A, 4C, and 4D and equations 1–4 (described below). Finally, in step 232, the routine calculates the ratio of the corrected lean and corrected rich times and stores this ratio as a function of the corrected lean time in the computer memory. Note that the routine could, in an alternate embodiment, simply use each calculated ratio at the end of a lean rich cycle to calculate an average ratio for the emission control device.

Alternatively, the ratio can be stored across different operating conditions such as, for example, the rich operating time.

Figure 3:
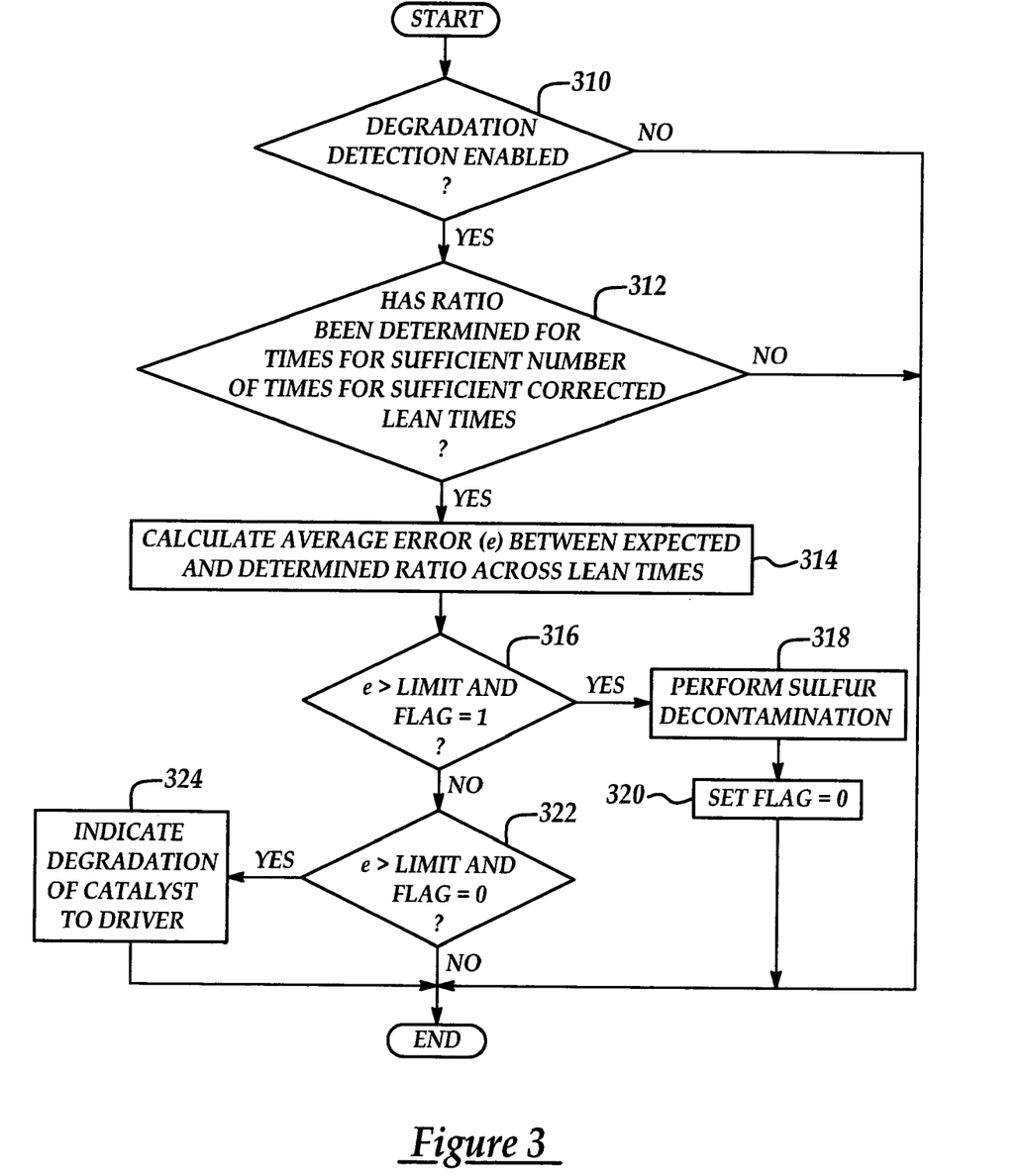

Referring now to FIG. 3, a routine is described for determining degradation of the emission control device based on the calculated ratio. First, in step 310, the routine determines whether degradation detection of the emission control device is enabled based on current operating conditions. For example, degradation detection may not be enabled during initial engine starting, or various high speed high load engine operating conditions. Further, the degradation detection is generally enabled only during lean burn operation as the routine utilizes the lean/rich operating time ratio as described above herein with regard to FIG. 2. Note however, that degradation detection can be enabled during other operating conditions if desired.

When the answer to step 310 is "yes", the routine continues to step 312. In step 312, the routine determines whether the ratio determined in step 232 has been determined for a sufficient number of lean/rich cycles, and for a sufficient range of corrected lean times. When the answer to step 312 is "yes", the routine continues to step 314.

In step 314, the routine calculates an average error (e) between the expected and determined ratios across the corrected lean times. In this way, the diagnostic routine utilizes information for a variety of lean operating times to determine degradation of the emission control device. Further, such an approach allows the routine to utilize expected emission control device performance that is efficiently stored as an expected ratio for various lean operating times.

Next, in step 316, the routine determines whether the average error is greater than a threshold value (LIMIT) and whether the flag (FLAG) is set to "1". Note that upon initialization, the flag (FLAG) is preset to "1". When the answer to step 316 is "yes", the routine continues to step 318 to perform a sulfur decontamination by operating the engine at increased exhaust gas temperatures and oscillating the inlet air-fuel ratio to the emission control device about stoichiometry to thereby remove sulfur. Next, in step 320, the routine sets the FLAG to "zero". In this way, the routine first attempts to utilize sulfur decontamination to rejuvenate the functionality of the emission control device.

When the answer to step 316 is "no", the routine continues to step 322 to determine whether the air is above the LIMIT value and the FLAG is set to "zero". When the answer to step 322 is "yes", the routine continues to step 324 to indicate degradation of catalyst 72 to the driver. When the answer to either steps 322, 312, or 310 is "no", the routine ends. In summary, the routine implements a diagnostic method that:

calculates $R_T$ after each lean-rich cycle (after the rich operation is over) using equations (1)–(3) (described below).

calculate $\overline{R}_T$ using the model of equation (4) (described below).

Calculate difference $e = R_T - \overline{R}_T$

If e becomes greater than a predefined threshold, activate deSOx process (which is to remove sulfate formed in catalyst 72) to recover NOx storage capacity.

If e becomes greater than a predefined threshold even after deSOx, indicate degradation of catalyst 72.

In this way, the engine controller is able to utilize information from both the lean operating (NOX storage) conditions and the rich operating conditions (NOX release and reduction) in order to more accurately determine the functionality of the emission control device. Thus, the catalyst monitoring algorithm monitors the ratio between the duration of lean engine operation and the duration of rich engine operation. The ratio is then used to characterize the "health" status (normal catalyst) as a degraded catalyst has a different characteristic from that of the normal catalyst. Then, when this difference become significant and exceeds a threshold, a degraded device is declared and indicated to the vehicle driver. In this way, on-board emission measurements are reduced and a simplified approach is obtained. This reduces strategy complexity and on-board computational requirements.

Model/Algorithm Details

Figure 4A:
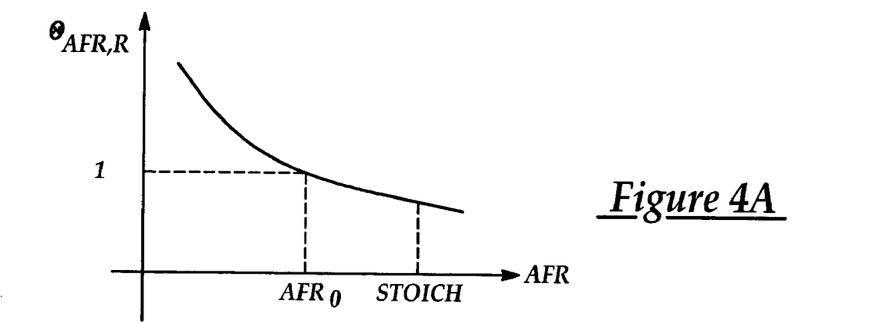
FIGS. 4A–4D are graphs illustrating correction factors for monitoring the emission control system according to an example embodiment of the invention.
Figure 4B:
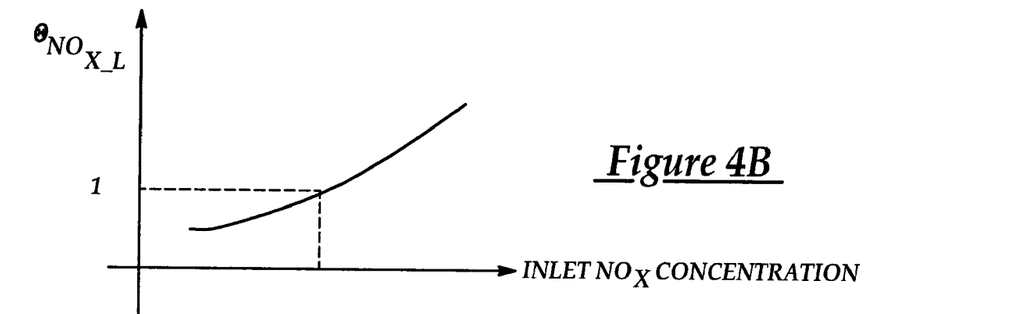
Figure 4C:
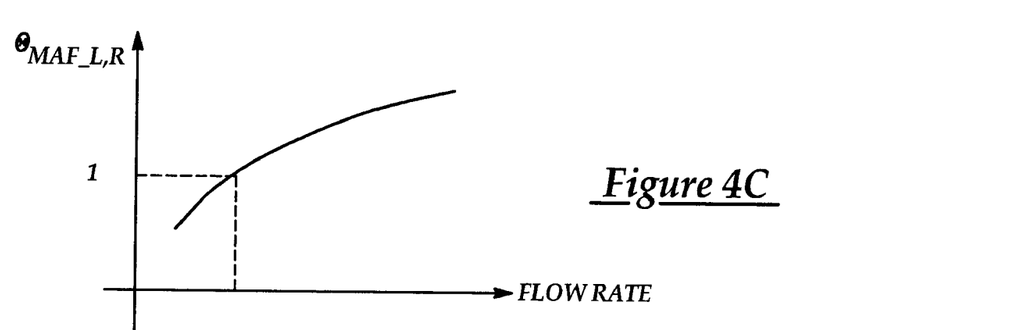
Figure 4D:
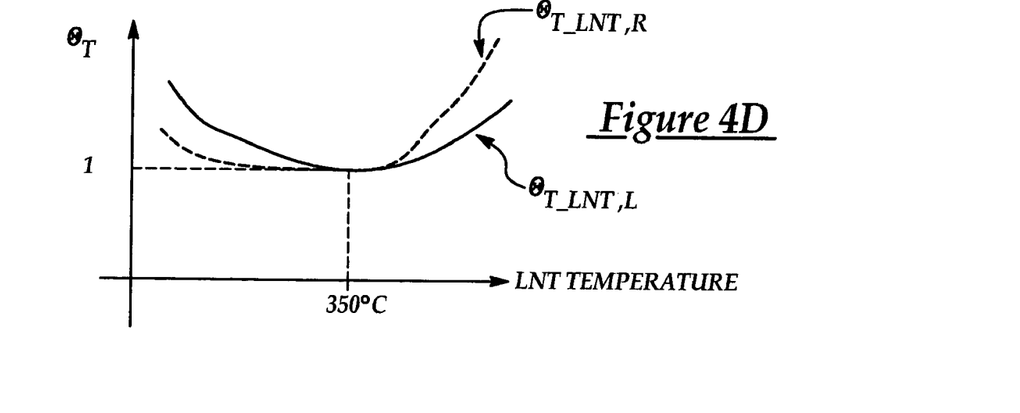

The Normalized Storage Purge Ratio (NSPR): RT is defined by equations 1–3, below:

$$R_T = \frac{T_L^*}{T_R^*} \quad (1)$$

$$T_L^* = T_L \times \theta_{Nox\_L} \times \theta_{MAF\_L} \times \theta_{T\_LNT\_L} \quad (2)$$

$$T_R^* = T_R \times \theta_{AFR\_R} \times \theta_{MAF\_R} \times \theta_{T\_LNT\_R} \quad (3)$$

where $T_L^*$: normalized lean duration [seconds]
$T_R^*$: normalized rich duration [seconds]
$T_L$: lean duration [seconds]
$T_R$: rich duration [seconds]
$\theta_{AFR\_R}$: normalization factor for air-fuel ratio during the rich operation (FIG. 4A)
$\theta_{NOx\_L}$: normalization factor for NOx concentration incoming to LNT during the lean operation (FIG. 4B)
$\theta_{MAF\_L,R}$: normalization factor for exhaust mass flow rate during the lean/rich operation (FIG. 4C)
$\theta_{T\_LNT\_L,R}$: normalization factor for LNT temperature during the lean/rich operation (FIG. 4D)

For a baseline, non-degraded catalyst, $R_T$ is found over engine and catalyst operation modes with a normal (healthy) catalyst. A model is found based on experimental data and testing for $R_T$ as a function of the lean engine duration and operating conditions using equation 4. This model and data is then stored in engine controller memory $$\bar{R}_T = f(T_L^*, \theta_{AFR\_R}, \theta_{MAF\_R}, \theta_{T\_LNT\_R}) \quad (4)$$

Referring now to FIGS. 4A through 4D, various correction factors are illustrated for either the lean operating time or the rich operating time, or both. The factors are stored in maps as a function of conditions as indicated in the Figures. Specifically, FIG. 4A illustrates a rich correction factor as a function of the rich air-fuel ratio during the rich operating. FIG. 4B illustrates a lean time correction factor as a function of the incoming NOX concentration to the emission control device. FIG. 4C illustrates both a lean and a rich correction factor as a function of the mass airflow sensor (e.g., exhaust flow rate). Finally, FIG. 4D illustrates both a lean and a rich correction factor as a function of exhaust gas temperature, or emission control device temperature.

Figure 5:
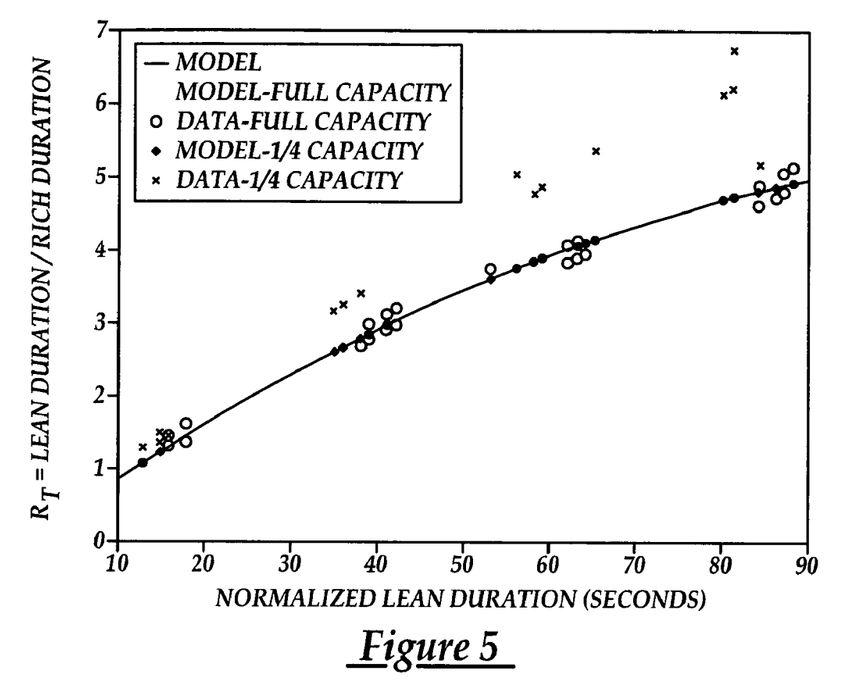
FIGS. 5–6 show experimental and predicted data illustrating operation of an example embodiment of the invention.
Figure 6:
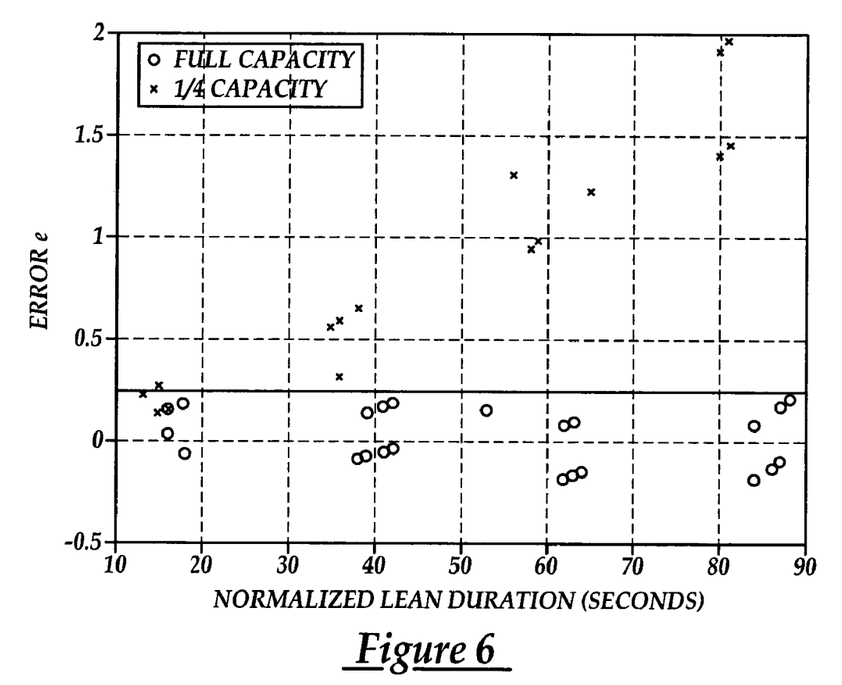

Experimental results of the approach described in FIGS. 2–4 are shown in FIG. 5–6. Specifically, FIG. 5 shows modeled and measured ratios for a full capacity catalyst and a ¼ capacity catalyst. Clear separation between the data can be seen, and is especially evident via the graph of FIG. 6. Increased sensitivity to degradation is obtained for increased lean operating times. As such, in one example embodiment of the present invention, the error (e) is only calculated and utilized for cycles where the corrected lean time is greater than a threshold value, e.g., 50 seconds.

Although several examples of embodiments which practice the invention have been described herein, there are numerous other examples which could also be described.

The invention claimed is:

1. A computer readable storage medium having stored data representing instructions executable by a computer to monitor a catalytic device coupled in an exhaust of an internal combustion engine of a vehicle, said storage medium comprising:
   instruction for operating the engine lean;
   instructions for ending said lean operation when an amount of NOx stored in the catalyst approaches a maximum capacity for NOx storage;
   instructions for determining a lean operation time;
   instructions for operating the engine rich after said lean operation is ended;
   instructions for ending said rich operation when stored NOx is released based on a downstream air-fuel sensor;
   instructions for determining a rich operation time;
   instructions for correcting said rich operation time based on a level of richness during said rich operation and an exhaust gas flow rate during said rich operation;
   instructions for correcting said lean operation time based on a NOx concentration during said lean operation and an exhaust gas flow rate during said lean operation;
   instructions for determining a ratio between said corrected lean time and said corrected rich time; and
   instructions for determining degradation of the catalyst based on said ratio.

2. The medium of claim 1, wherein said instructions for ending said lean operation further comprise instructions for ending said lean operation when an estimated amount of NOx stored in the catalyst approaches said maximum capacity for NOx storage.

3. The medium of claim 1, wherein said instructions for determining degradation of the catalyst based on said ratio further comprise:
   instructions for retrieving a stored expected ratio as a function of operating conditions; and
   comparing said expected ratio to said determined ratio to determine degradation of the catalyst.

4. The medium of claim 3, wherein said stored expected ratio is stored as a function of said lean time.

5. The medium of claim 1, further comprising:
   instructions for correcting said rich operation time based on a level of richness during said rich operation and an exhaust gas flow rate during said rich operation;
   instructions for correcting said lean operation time based on a NOx concentration during
   said lean operation and an exhaust gas flow rate during said lean operation; and
   instructions for determining said ratio between said corrected lean time and said corrected rich time.

6. A computer readable storage medium having stored data representing instructions executable by a computer to monitor a catalytic device coupled in an exhaust of an internal combustion engine of a vehicle, said storage medium comprising:
   instructions for operating the engine lean;
   instructions for ending said lean operation based on a NOx sensor coupled downstream of the catalyst;
   instructions for determining a lean operation time;
   instructions for operating the engine rich after said lean operation is ended;
   instructions for ending said rich operation when stored NOx is released based on a air-fuel sensor coupled in the exhaust;
   instructions for determining a rich operation time;

instructions for correcting said rich operation time based on a level of richness during said rich operation and an exhaust gas flow rate during said rich operation;
instructions for correcting said lean operation time based on a NOx concentration during said lean operation and an exhaust gas flow rate during said lean operation;
instructions for determining a ratio between said corrected lean time and said corrected rich time;
instructions for retrieving a stored expected ratio as a function of said corrected lean time;
instructions for comparing said ratio to said expected ratio; and instructions for determining degradation of the catalyst based on said comparison.

7. A method to monitor a catalytic device coupled in an exhaust of an internal combustion engine of a vehicle, comprising:
operating the engine lean;
ending said lean operation when an amount of NOx stored in the catalyst approaches a maximum capacity for NOx storage;
determining a lean operation time;
operating the engine rich after said lean operation is ended;
ending said rich operation when stored NOx is released based on a downstream air-fuel sensor;
determining a rich operation time;
correcting said rich operation time based on a level of richness during said rich operation and an exhaust gas flow rate during said rich operation;
correcting said lean operation time based on a NOx concentration during said lean operation and an exhaust gas flow rate during said lean operation;
determining a ratio between said corrected lean time and said corrected rich time; and
determining degradation of the catalyst based on said ratio.

8. The method of claim 7, wherein said ending said lean operation further comprises ending said lean operation when an estimated amount of NOx stored in the catalyst approaches said maximum capacity for NOx storage.

9. The method of claim 7, wherein said determining degradation of the catalyst based on said ratio further comprises:
retrieving a stored expected ratio as a function of operating conditions; and
comparing said expected ratio to said determined ratio to determine degradation of the catalyst.

* * * * *